United States Patent [19]

Caldwell

[11] 4,043,665

[45] Aug. 23, 1977

[54] COPIER DOCUMENT HANDLER

[75] Inventor: John R. Caldwell, Rochester, N.Y.

[73] Assignee: Xerox Corporation, Stamford, Conn.

[21] Appl. No.: 561,465

[22] Filed: Mar. 26, 1975

[51] Int. Cl.² .................. G03B 27/62; G03B 27/64
[52] U.S. Cl. .................................... 355/76; 271/243; 271/276; 355/3 R
[58] Field of Search ................. 355/3 R, 13, 14, 75, 355/76, 91, 93, 133, 55, 56, 57; 271/4, 197, 276, 243

[56] References Cited

U.S. PATENT DOCUMENTS

| | | | |
|---|---|---|---|
| 3,062,110 | 11/1962 | Shepardson et al. | 355/11 |
| 3,079,839 | 3/1963 | Lohner et al. | 355/76 X |
| 3,103,850 | 9/1963 | Khoury et al. | 355/76 |
| 3,162,765 | 12/1964 | Cran | 250/560 |
| 3,166,311 | 1/1965 | Rabinow et al. | 271/12 |
| 3,430,952 | 3/1969 | Benjamin | 271/197 |
| 3,433,564 | 3/1969 | Lahr | 355/76 |
| 3,473,035 | 10/1969 | Gardner et al. | 250/548 |
| 3,510,125 | 5/1970 | Krueger et al. | 271/10 |
| 3,552,739 | 1/1971 | Roberts et al. | 271/4 |
| 3,556,512 | 1/1971 | Fackler | 271/4 |
| 3,589,713 | 6/1971 | Schulze | 271/41 |
| 3,779,644 | 12/1973 | Nosco et al. | 355/75 |
| 3,790,158 | 2/1974 | Summers et al. | 271/4 |
| 3,815,990 | 6/1974 | Newcomb et al. | 355/13 |
| 3,829,082 | 8/1974 | Hoyer | 271/4 |
| 3,844,552 | 10/1974 | Bleau et al. | 355/75 X |

Primary Examiner—Fred L. Braun

[57] ABSTRACT

Improved document handling for a xerographic copier with automatic feeding onto, and ejection of documents from, a full size conventional document copying platen is provided by a vacuum belt system in a platen cover unit. The document support surface of the vacuum belt is spaced slightly above the platen for low friction document movement, yet maintained within copying focus. This document support and background surface of the belt is smooth, planar and continuous and stationary during copying so as to provide document flattening and allow document copying on the platen by the conventional stationary document copying optics. Book copying or manual copying can be provided on the same platen by pivotal removal of the platen cover unit away from the platen. A document pre-registration and skew-correction system is disclosed in which over-platen registration is not required. A pivotal system is also disclosed for limited lifting of the vacuum belt system for document ejection assistance.

5 Claims, 4 Drawing Figures

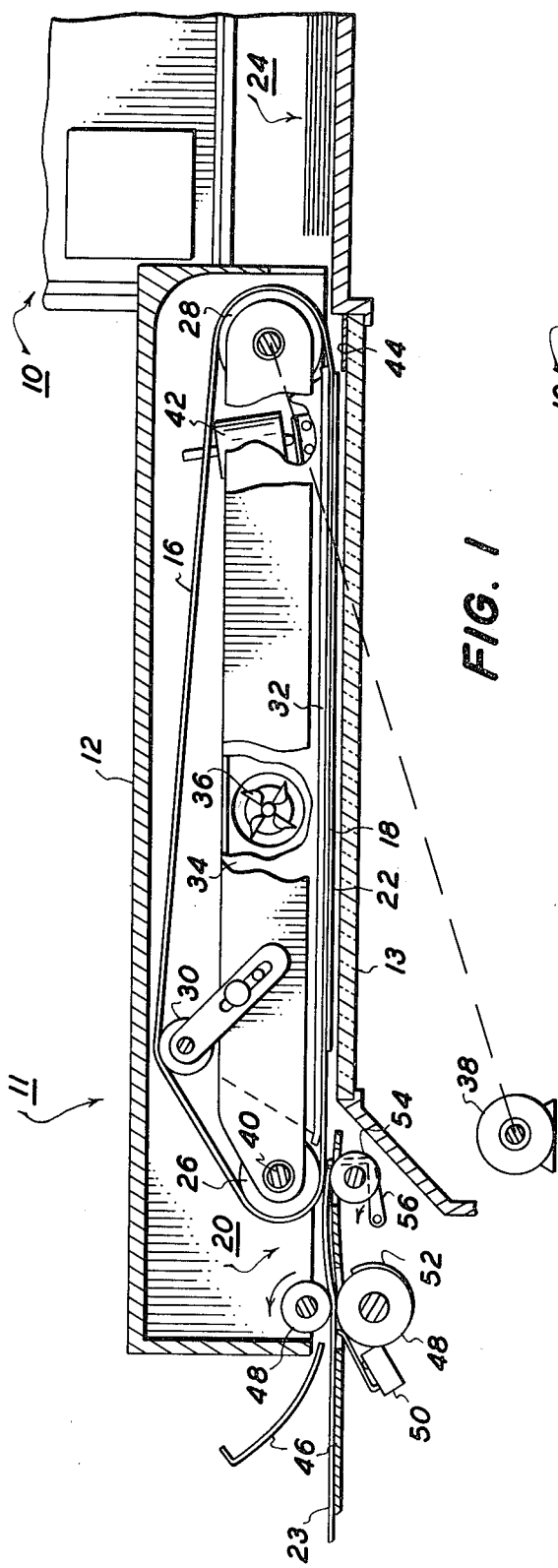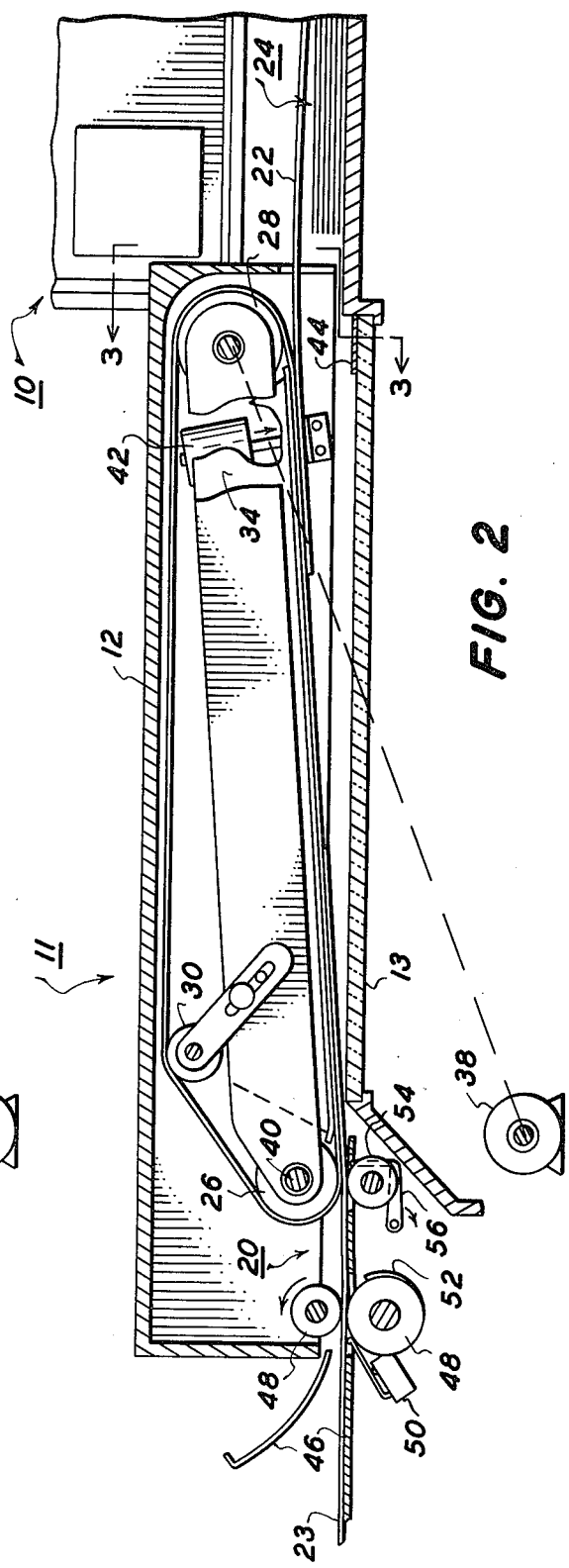

COPIER DOCUMENT HANDLER

The present invention relates to document copying apparatus, and more particularly to apparatus for automatically moving documents into and out of a copying station in copying apparatus for improved copying speed or convenience.

Document copying, particularly for the faster xerographic copiers now in commercial use, such as the Xerox 4000 copier, presents challenges in the faster handling of the documents being copied in order to utilize the faster copying capability of the copier. [The terms copier or copying as used here are intended to also cover duplicators and other optical reproduction devices.] However, original documents may vary widely in size, weight, condition, value, age, and thickness and may have curls, tears, wrinkles, staples, etc. This presents obvious difficulties in providing for faster and more automatic document handling, without document damage, and with good registration and positive document handling, yet with a relatively compact and inexpensive device. The presently disclosed apparatus provides for sequential automatic and registered placement of the documents on a conventional transparent copying platen (window), and provides for conventional stationary document copying with the existing optics system, and provides faster document handling, by the cooperating combination of several document handling features. Both real and operator perceived document safety is provided by manual operator accessibility to the document at any time in operation and by the use of diffuse, low pressure, vacuum and frictional forces to transport and register the document over the copying station platen.

The document handling art is well-developed and includes commercial products for automatically feeding documents onto a xerographic copying platen with transport belts and/or removing them after copying. Some examples of art disclosing certain features of the present specification are the following U.S. applications and patents which are made of record as a part of this specification to the extent they are relevant without any representation as to completeness: Allowed Ser. No. 449,401, filed Mar. 8, 1974, by the same John R. Caldwell, Group 211, now U.S. Pat. No. 3,888,581 and the references therein; U.S. Pat. Nos. 3,790,158, issued Feb. 5, 1974, to J. E. Summers et al, Class 271/4; 3,510,125, issued May 5, 1970, to J. R. Krueger et al, Class 271/10; 3,062,110, issued Nov. 6, 1962, to D. W. Shepardson et al, Class 95-1.7; 3,589,713, issued June 29, 1971, to J. L. Schulze, Class 271/41; 3,844,552, issued Oct. 29, 1974, to C. D. Bleau et al, Class 271/245. Other relevant copier document imaging transport belts are in U.S. Pat. Nos. 3,473,035, issued Oct. 14, 1969, to J. F. Gardner et al, Class 250/219; and 3,430,952, issued Mar. 4, 1969, to J. G. Benjamin, Class 271/74. In the sheet folding art mechanisms for advancing a sheet a pre-determined distance on a conveyor from an initial edge registration position are disclosed in U.S. Pat. No. 3,162,765, issued Dec. 22, 1964, to W. B. G. Cran, Class 250/223. Pivoting of one end of a sheet transport belt for loading is disclosed in U.S. Pat. No. 3,166,311, issued Jan. 19, 1965, to J. Rabinow et al, Class 271/12.

Further objects, features, and advantages of the present invention pertain to the particular apparatus, steps, and details whereby the above-mentioned aspects of the invention are attained.

Accordingly, the invention will be better understood by reference to the following description and to the drawings forming a part thereof, which are generally to scale, wherein:

FIG. 1 is a front view, partially broken away for clarity, of an exemplary document handling embodiment of the present invention, in its copying position, as part of an otherwise conventional xerographic copying apparatus;

FIG. 2 is the same as FIG. 1, illustrating the document infeeding and ejecting position;

Figure 3:
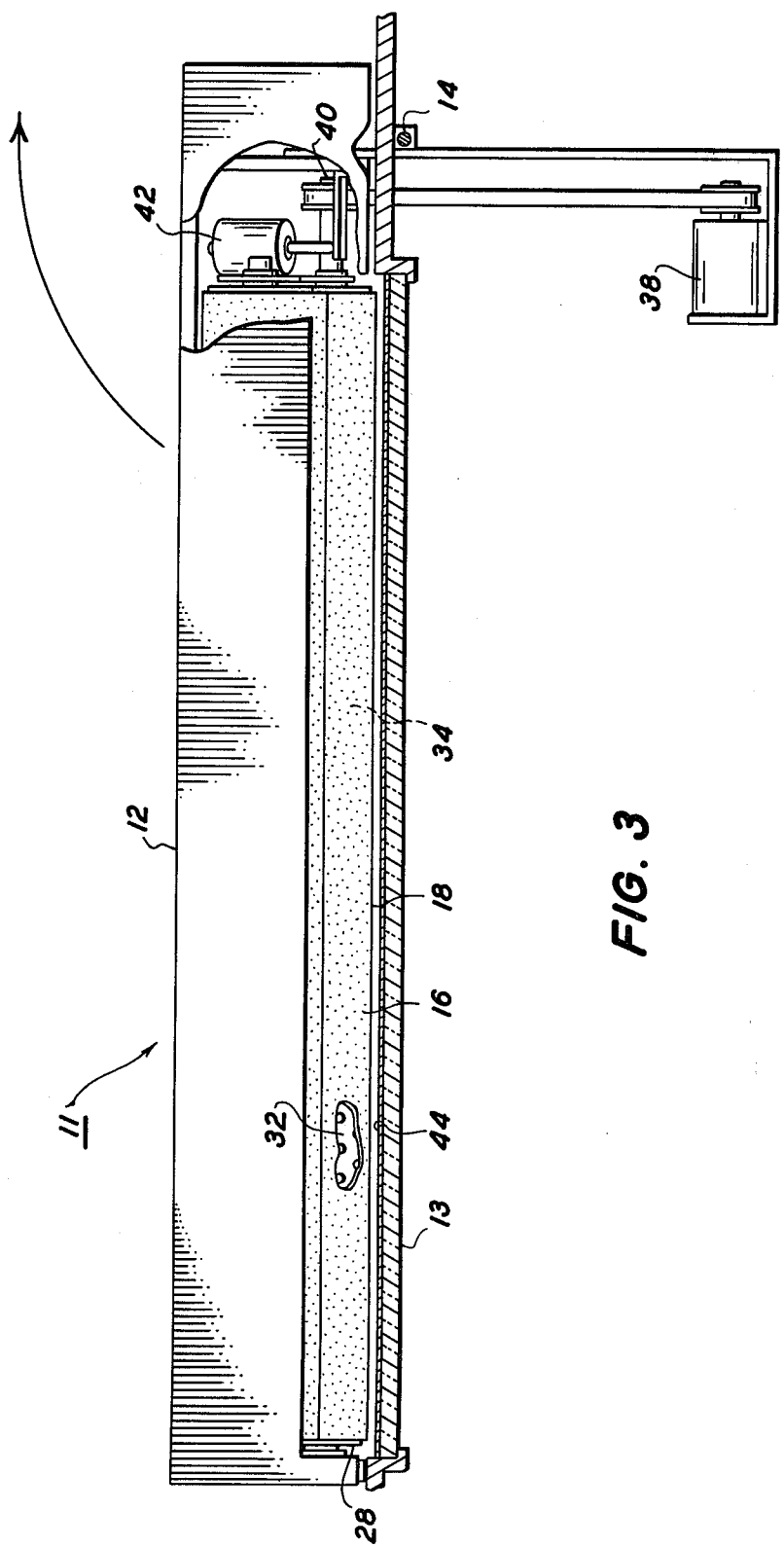
FIG. 3 is a side view of the embodiment of FIGS. 1-2, partially broken away to illustrate internal components, taken along the line 3—3 of FIG. 2.

Referring now to the drawings, FIGS. 1-4, there is shown therein an exemplary copying apparatus 10 with an exemplary document handling system 11 in accordance with the present invention. For clarity, various components are illustrated schematically. The disclosed document handling structure 11 comprises a relatively simple and inexpensive "add-on" to the copier 10, which here is an existing Xerox 4500 copier. However, it will be appreciated that the invention is applicable to many other copiers.

Figure 4:
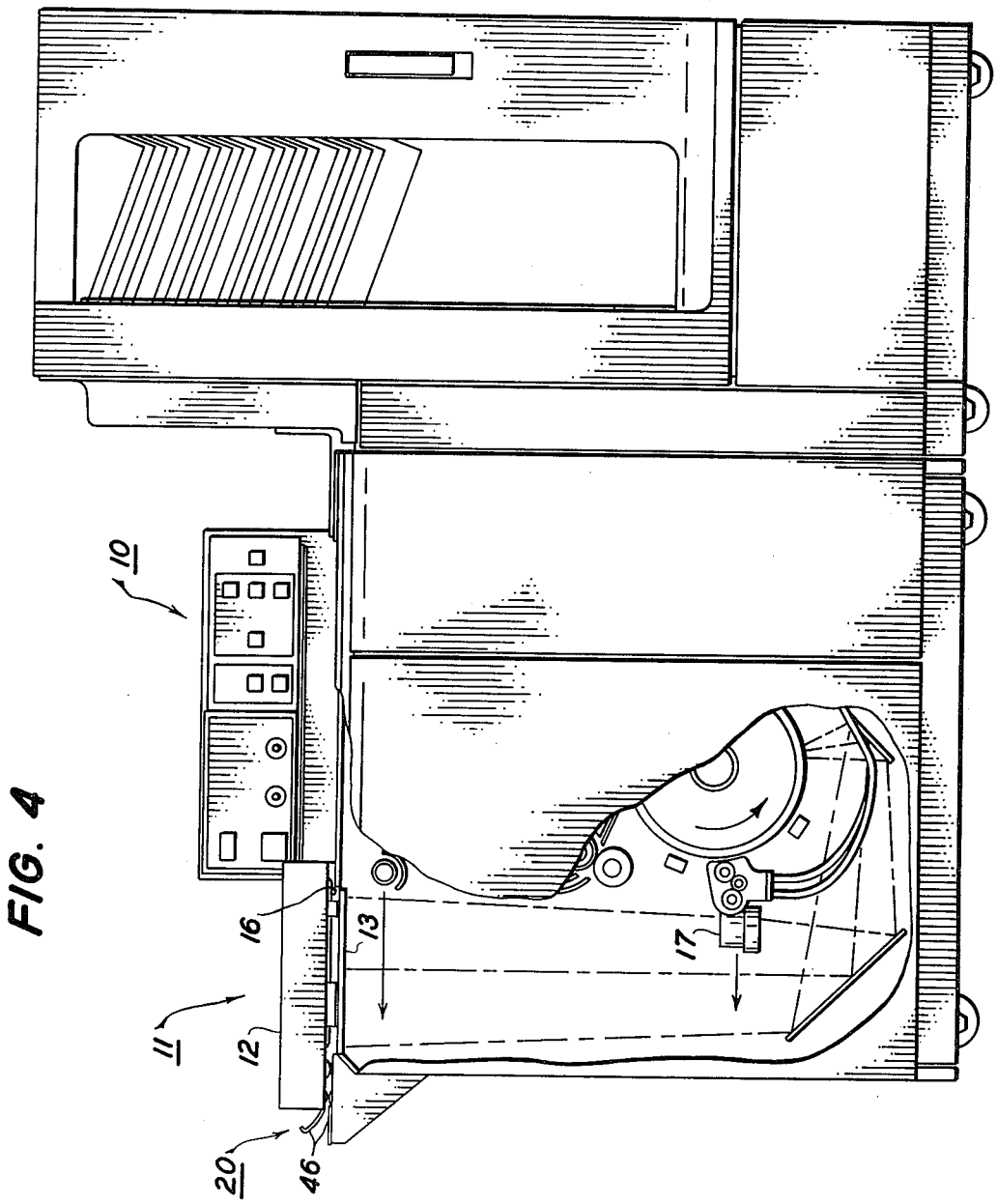
FIG. 4 is a frontal view of the embodiment of FIGS. 1-3 further schematically illustrating the conventional xerographic copying apparatus associated therewith.

The disclosed structural modification of the present commercial 4500 copier here comprises the replacement of the present passive platen cover with a new platen cover unit 12 containing a number of important features to be described herein; and, of course, the electrical interconnection of the new platen cover components, including logic circuitry, with the existing logic of the copying apparatus 10. FIG. 4 illustrates the existing scanning optics system for copying a document held over the transparent glass platen 13, both of which are unchanged here. U.S. Pat. No. 3,775,008, and others, disclose further details of such an optics system.

Referring to FIG. 4, it may be seen that the disclosed exemplary document imaging means here comprises an imaging lens 17 for viewing the illuminated document through the platen from underneath the platen, and for focusing the image of that document onto the photoreceptor drum or other copying surface. The lens 17 is conventionally focused at the upper surface of the platen 13, where the document is normally pressed in manual copying. However, the lens 17 has a predetermined or pre-set acceptable optical depth of field which extends slightly above the platen, by approximately 3 millimeters or so. Here the document is held above the platen, but within this optical depth of field, so that it is still in focus and imageable in the same manner. This optical depth of field is substantially greater than the thickness of a normal or conventional document. In fact, paper of conventional thickness is substantially thinner than 1 millimeter. Thus, it has been found that the support or background surface for the document can also be within this depth of field and yet not press the document against the platen.

All of the features to be described herein are in addition to the existing copying apparatus 10 features. Thus, the machine 10 may perform all of its previous functions and also selectively utilize the features added by the document handling system 11 disclosed herein. The disclosed document handling system increases the overall effective operator copying speed of the machine, particularly in those copying situations in which only one copy or a few copies are being made from each individual document. This copying speed increase is accomplished by automated document handling functions reducing the required document placement accuracy and reducing document handling by the operator as compared to manual copying.

Considering now in greater detail the disclosed structures and functions of the exemplary document handling system 11 disclosed herein, it may be seen that this unit is contained within the platen cover unit 12, and that the platen cover unit 12 is pivotally mounted over the platen 13. As may be seen from FIG. 3, this is a generally conventional hinge mounting, with an axis of rotation 14 extending along the rear edge of the platen 13 and the platen cover unit 12, providing rotation of the cover unit 12 in the direction illustrated by the movement arrow in FIG. 3. A suitable or conventional spring counterbalance is preferred for operator assistance in the manual lifting of the cover unit 12 up away from the platen into a raised or upright position, and for retaining the entire unit in that upright position. In this raised position, the platen 13 is exposed and unobstructed, and documents or books may be readily manually placed on the platen for manual copying without requiring any further handling of the platen. The providing of the axis 14 at the rear of the platen cover unit 12 here also provides an unobstructed automatic document feeding path from left to right, as illustrated here, across the platen 13. (It will also be appreciated, of course, that document feeding onto and off of the platen could be provided in the reverse direction, where desired, with appropriate modifications.)

The platen cover unit 12 may be held down over the platen 13 by the uncounterbalanced portion of its weight, and/or by suitable mechanical or magnetic latches as discussed in the above-cited application Ser. No. 449,401, now U.S. Pat. No. 3,888,581 for example. As is also discussed in that prior application, it will be appreciated that the lifting of the platen cover can be made automatically upon the completion of a copying cycle, if so desired.

Referring to FIGS. 1-3, the document handling system 11 here includes a continuous vacuum belt 16 with a document transporting lower flight 18 on which the documents are individually transported over the platen 13, spaced therefrom, into the copying position registered over the platen and then subsequently ejected from the platen. An off-platen document station 20 is provided for feeding and pre-registering the documents prior to their being transported on the vacuum belt 16.

Upon the completion of the stationary copying of a document 22 by the desired number of times while the entire system is stationary, (in the position illustrated in FIG. 1) the vacuum belt 16 is then, as illustrated in FIG. 2, automatically driven to eject the document 22 out from the document handling system 11 onto an appropriate document output stack 24. Simultaneously the next document 23 to be copied is fed onto the vacuum belt 16 from the infeeding station 20, as also illustrated in FIG. 2.

The vacuum belt 16 here is illustrated as retained and positioned by opposing support rollers 26 and 28 normally located at the upstream and downstream sides of the platen, with respect to the feeding direction of the documents. An adjustable positioning tensioning roller 30 is also illustrated for tensioning the return (upper) flight of the belt. The document supporting (lower) flight 18 of the belt is retained and supported by, and slidably continuously engages, an apertured planar vacuum plate 32. The plate 32 extends over substantially the entire area of the platen 13, and the area between the two support rollers 26 and 28. Thus, the vacuum plate 32 defines the position and configuration of the vacuum belt 16 over substantially the entire flight 18 thereof.

This vacuum plate 32 is the operating surface of a vacuum plenum or vacuum chamber 34 mounted inside the belt 16. This vacuum chamber 34 is provided with a vacuum pressure slightly below atmospheric by a low pressure motor driven fan unit 36 (illustrated in FIG. 1) mounted at the only outlet of the vacuum chamber 34. The apertures in the vacuum plate 32 are the principal inlet to the vacuum chamber 34 and, therefore, apply the vacuum diffusely over the inside surface of the flight 18 of the vacuum belt 16. Examples of the apertures in the plate 32 are illustrated in FIG. 3 where a small area of the belt 16 is drawn "broken away" for illustration.

The material of the vacuum belt 16 is a strong relatively non-stretching plastic or other suitable material which is finely apertured so as to be air permeable and to allow the vacuum from the vacuum chamber 34 to be applied through the belt to a document carried on the outer surface of the belt. The belt 16 outer surface is also preferably white (light reflecting), readily cleanable, smooth, and continuous (a single belt extending uninterruptedly over the entire platen imaging area). This is to provide a suitable document "background" for copying. When the document is illuminated (from below the platen) for copying it is desirable, particularly for undersized or apertured or translucent documents, that there not be any areas of contrast in any areas of the belt outside of the document image areas, but within the platen confines (the imaging area). If there is, this can cause a visible "print-out" from the image of the belt itself on the copy sheets. Thus, the vacuum holes in the vacuum belt are preferably made as small as possible, consistent with contamination or air flow clogging problems, so as to avoid shadow areas of contrast at the vacuum holes which could cause a print-out pattern. It is desirable to also avoid print-out of the vacuum holes in the underlying vacuum plate 32 by, for example, making the belt 16 effectively opaque to the illumination from the copier illumination system.

Although a homogenious belt 16 material is illustrated, it will be appreciated that the surface of the apertured belt may be covered with woven or non-woven cloth or fiberous materials, open celled foraminous material, or other such porous surfacing materials if so desired.

One example of a material and construction for the vacuum belt 16 would be an integral sheet of "Melenex 1C1" approximately 0.010 inches thick and bonded together at the ends of the sheet to form an endless belt. The outside (imaging) surface can be coated with a white silicone rubber material approximately 0.003 inches thick by spraying or the like. This exemplary belt 16 could be apertured with approximately 0.02 inch diameter holes spaced apart approximately 0.06 to 0.08 inches to provide the vacuum apertures therein.

As shown in FIG. 3, one appropriate drive system for the belt 16 is by a belt from a conventional drive motor 38 up to an idler pulley on the support roller 26 and thence by another belt to a drive pulley on the downstream support roller 28, which then drives the belt 16. This provides a pulling or tensioning drive on the flight 18 of the belt 16 for additional insurance of its flatness against the vacuum plate 32. For more positive drive of the belt, sprocket holes may be provided along the edges of the belt outside of the document carrying (vacuum apertured) main portion of the belt, and mating sprockets provided on the ends of roller 28.

As may be seen by the differences between FIGS. 1 and 2, the axis of the support roller 26 is also the axis 40 for rotation of the vacuum belt 16, the vacuum chamber 34, its plate 32, and their associated components (hereinafter jointly referred to as the belt unit) commonly about this axis 40, but within, and relative to, the platen cover unit 12. This illustrated slight rotation of the belt unit provides a lifting of the downstream end of the flight 18 of the vacuum belt 16 substantially away from the platen 13 during the document loading/unloading operation as will be subsequently described. This pivoting of the vacuum belt unit up away from the platen 13 may be accomplished by various suitable mechanisms. The schematic example here is a solenoid 42 fastened to the belt unit frame with its plunger pushing against a projection of the cover unit 12.

As may be seen from the difference between FIG. 2 and FIG. 1, the raising of the downstream end of the document belt unit by the actuation of the solenoid 42 (or other appropriate lift mechanism) raises the level of the lead edge of the document 22 at its point of ejection from the belt unit. That ejection area is the point at which the belt 12 moves past the downstream end of the vacuum chamber 34 and the document area thereon is no longer supported. This also coincides here with the beginning of the curvature of the belt up around the support roller 28 which causes a sheet beam stripping action to insure stripping of the sheet from the belt.

This pivotal raising of the document ejection level here prevents the lead edge of the document from striking an existing manual registration edge guide 44 such as illustrated here. Also, in the case of a platen which is recessed below the plane of the top of the copying apparatus 10, as is the case here, this raises the document level up above the upper surface of the copying apparatus 10. Sufficient document lift can be provided, as illustrated, to insure that the sheets are ejected above the level of the top of a stack 24 of documents previously copied and ejected, so that the additional documents may be readily fed out over the top of the stack 24 and fall thereon by gravity.

Since there is no obstruction to the outfeeding of the documents, they can be positively driven out here without requiring any additional output rollers or the like. The document ejection drive is provided simply by the retention and continued movement of the rear portion (trail edge area) of the document 22 on the vacuum belt 16, as shown in FIG. 2.

Only the downstream end of the belt unit pivots up for document ejection here. It will be appreciated that with other copier configurations, such as those with a sufficiently raised platen, that even this movement would not be necessarily required or desirable. Even here, the rest of the entire document handling system 11 remains stationary with respect to the platen during the document loading, copying, and ejection operation. However, the entire cover unit 12 may be removed at any time for inspection, jam, clearance, cleaning, etc., simply by pivoting the entire unit up around its mounting axis 14, as previously described.

Considering now the exemplary infeeding station 20 illustrated here, this station here provides positive feeding of the document and its initial registration and skew correction from the initial input of the document to the copying apparatus to its engagement with, and transport by, the vacuum belt 16 for copying. The apparatus 20 disclosed herein is designed for manual document sheet separation and individual sequential feeding in of documents manually by the operator. This provides maximum protection from document damage. However, it will be appreciated that various suitable or conventional automatic document feeders could be additionally provided at the input for automatically separating and chain feeding individual documents from a stack of documents, using sheet feeders such as those disclosed, for example, in U.S. Pat. No. 3,768,803, issued Oct. 30, 1973, to K. K. Stange.

Examples of details of registration gate and drive wheel hardware may be seen, for example, in U.S. Pat. Nos. 3,281,144, issued Oct. 25, 1966, to L. H. Turner et al, and 3,517,923, issued June 30, 1970, to D. S. Hoffman et al. Further, details of a timed copy sheet buckling registration and skew correcting system are disclosed in a pending U.S. application Ser. No. 503,584, filed Sept. 5, 1974, now abandoned, by T. N. Taylor et al. The buckling there is between a copy sheet feeder and a registration roller/gate unit.

With the feed station 20 here, a document 23 is manually placed by the operator into the throat of a converging pair of sheet guides 46 which guide the lead edge of the sheet into the nip area of opposing pair sets of pre-registration rollers 48. The lowermost of the sheet guides 46 here can be the lower surface of an input tray on which the documents may be stacked for convenience, if desired. Pre-registration gates 52 are rotatably mounted near opposite ends of one of the pre-registration roller 48 shafts. As the document is initially fed through the open nip of the pre-registration rollers 48, it abuts, and is stopped by, at least one of these two spaced apart pre-registration gates 52. A switch 50 is centrally located in the same nip area, but slightly upstream of and intermediate the gates 52. This switch 50 is tripped by the lead edge of the document 23, if the document is not grossly out-of-skew, at substantially the same time the document reaches the gates 52. However, if the document is fed in with one side of its lead edge against one gate 52, but excessively skewed to the document path direction (so that the skew could not be subsequently corrected), or if it is not fed into either gates 52 sufficiently for gross registration, then the switch 50 will not be tripped until the operator pushes the sheet 23 in further and/or with reduced skew.

The tripping of the switch 50 by the central lead edge of the document provides an electrical signal to the machine logic indicating the presence of a document for copying in the pre-registration rollers 48 nip and its acceptably gross alignment for skew and registration. This signal initiates the copying cycle automatically. The pre-registration rollers nip 48 is closed by a cam actuated lever or the like, the pre-registration gates 52 are rotated out of the path of the document, as shown in FIGS. 1 and 2, and the rollers 48 are rotatably driven in the sheet feeding direction so as to positively feed the document on toward a transversely spaced pair of registration gates 56. The registration gates 56 are spaced downstream from the pre-registration gates 52 by a distance which is less than the length of any document to be copied, but by a distance which is sufficient to allow a buckle to form in the document 23 between the registration gates 56 and the pre-registration rollers 48, as shown in FIG. 1.

Slightly upstream of the registration gates 56 a coaxial set of registration rollers 54 has transverse nip areas across the upstream end of the belt 16 flight 18, beneath the support roller 26. At this point in the operation of the infeeding station 20, as illustrated in FIG. 1, the registration rollers 54 nips are open and the registration gates 56 have been pivoted up against the belt 16 intermediate the registration rollers 54 to block the forward path of the document. The belt 16 is stationary at this point. This causes the buckle to form in the lead area of the document 23 as the document continues to be fed forward for a slight distance by the pre-registration rollers 48 beyond the feed distance required for its lead edge to reach the registration gates 56. This slight overdrive of the document by the pre-registration rollers to buckle the document lead edge against both of the registration gates 56 provides the final skew and registration correction of the document. All of this infeeding station 20 activity occurs outside of (off of) the platen 13, and can be done during the copying of the preceding document.

The next step of infeeding is initiated only after the preceding document has been copied. The registration pinch rollers 54 are raised against the belt 16 to nip the document lead edge against the belt and are then rotatably driven as idlers by the belt, which is started to advance the document together with the belt, while the registration gates 56 are swung out of the path of the document, as illustrated by the movement arrows in FIG. 2. This next step is initiated automatically only after the completion of copying of a document already on the platen. The document is driven foward by its engagement against the belt and its lead edge is almost immediately retained positively against the belt 16 by the closely spaced upstream end of the vacuum plate 32. Even if the lead edge of the document has a slight downward curl, the document cannot readily avoid capture by the vacuum forces of the vacuum belt 16 since the registration rollers 54 continue to press the immediately downstream area of the document against the belt for the feeding of the entire document. The document movement is integral with the belt movement from its release by the registration gates and thereafter until the document is ejected by the belt. There is no slippage provided between the document and the belt.

It will be appreciated that a conventional stationary or adjustable side guide can be utilized to provide manual side registration (registration lateral the document feeding path) for documents at the input area. The document can be conventionally slid past a linear lip or flange providing this side edge registration. If desired, the pre-registration or other feed rollers can be slightly skewed towards the side guide to insure that the document is held against the side guide.

The vacuum belt 16 is driven only a known pre-set distance (or a known pre-set time at a constant speed) by suitable mechanical or electrical drive or clutch means following the release of the lead edge of the sheet from the registration gates 56. Thus, the document is always driven only a known constant distance out over the platen 13 by the vacuum belt 16, and the belt 16 is thereafter stopped for the copying operation. This pre-set advancement distance of the belt 16 by its drive provides the registration of the document over the platen. The document pre-registration in the registration gates 56 of the infeeding station 20 provides a known starting point position of the document relative to the platen. Thus, it may be seen that there is provided here a registration system in which no gates or registration systems are required over the platen. No gates, fingers or stops are required to halt or sense the lead edge of the document as it advances toward the downstream side of the platen. Rather, the document is stopped in its image registration position only by the stopping point of the vacuum belt 16. The drive of the belt is pre-set to stop the document with its lead edge located at the proper position over the platen 13 for proper registration of the entire document for copying by the copying apparatus 10. This registration system, with positive continuous document retention by its drive system, eliminates the difficulties in placing and operating such gates at the exact downstream edge of the platen. Thus, it eliminates the potential damage to documents of their being conventionally frictionally slip overdriven against a registration gate while over the platen, which can cause wrinkling or buckling over the platen, misregistration by excessive drive slip, etc. No drive slip on the document is provided or desired with the present system.

This registering of the document over the platen at the same position for each document is accomplished fully automatically without any operator alignment or intervention. This can provide a substantial increase in copying through-put speed in comparison with manual copying. With manual copying the manual shifting or positioning of the document on the platen accurately into the properly registered platen position, using a manual edge guide 44 or the like, consumes a significant portion of the normal copying time, and normally requires the operator to intermittently skip copying cycles of a rapid copying machine which could otherwise be utilized. This is particularly true in the case of a synchronous copying apparatus in which copies are made only on predetermined positions on the photoreceptor, thus requiring a time delay for further movement of the photoreceptor to the next imaging position if copying is not initiated in time for the first available position of the photoreceptor. With the present system the loss of any, or more than one, copy cycle between documents can be avoided by the rapid feeding and registration of succeeding documents.

It is important to note that in the document handling system 11 disclosed herein, that the entire vacuum belt 16, including the document transporting flight 18 thereof, is continuously spaced slightly out of contact with (above) the entire platen 13, unlike prior document handling systems in which document feed rollers or belts, or areas thereof, forceably frictionally engage the document against the platen. This is even though full document size stationary document copying platen is utilized here. Here the document supporting surface of the vacuum belt is continuously and uniformly spaced slightly above the platen, and holds the documents by the pressure differential created by the vacuum force applied to the back of the document through the belt 16 while the platen-facing side of the document is exposed to ambient air. Thus, the entire document (with the occasional exception of curled or wrinkled areas or a minor central portion) can be normally maintained out of contact with the platen 13 at all times, even for copying. This provides low friction document movement, since the document is not at any time subjected to frictional engagement with either the platen or any other surfaces here once it has been fed into the platen area. Yet, the document supporting background surface of the vacuum belt 16 is maintained within the optical depth of field or focus of the optical system of the conventional optical system of the copying apparatus, so that all portions of the document are maintained in focus for copying over the platen. This imaging background surface, the outer surface of the flight 18 of the vacuum belt 16, is smooth, planar, continuous and stationary during copying so as to provide positive document flattening between it and the platen 13 of any curls or wrinkles in the document, and thus to insure that the entire document is in focus.

A suitable exemplary air spacing between the vacuum belt 16 lower surface and the upper surface of the platen 13 for copying here is approximately .04 inches (one millimeter). Such a spacing may be pre-set or adjusted by having a prefixed closed position for the platen cover unit 12 relative to the platen 13 surface and by an adjustable mounting of the vacuum belt unit relative to the platen cover unit 12. The platen cover unit 12 can engage the upper surface of the copying apparatus 10 at an area or areas outside of the platen 13. This adjustable mounting may be similar, if desired, to the spacing arrangement provided for the platen cover lower surface of the document handling system disclosed in the above-cited U.S. Pat. No. 3,888,581. As described there, this spacing may be pre-set or adjusted by using a spacing plate or shim of the desired thickness temporarily laid over the platen 13. The belt unit here can then be adjusted down against the spacing plate and then secured in position. A conventional bolt and slot mounting adjustment or the like can be used.

As will be apparent from the above description, the machine copying logic is interconnected to the above-described automatic document handling system so that copying for the desired number of cycles is initiated as soon after the document is in its registered position over the platen as the copying apparatus is ready for copying. A pre-set single copy cycle skip or other time delay can be readily built into the logic.

It will also be appreciated that the disclosed document system may be utilized with full frame flash exposure copying or other stationary document copying systems, including those providing copy size reduction, as well as scanning optics systems. Adjustment to different registration positions on the platen for different document sizes can be made by adjusting the length of time or distance that the vacuum belt 16 is driven from the release of the lead edge of the document thereto.

A document feeder with off-platen document trail edge sensing controlling a (shorter) pre-set timed slow drive of a document feed belt over a platen for document registration is known (U.S. Pat. No. 3,674,363, issued July 4, 1972, to E. O. Baller et al). However, the disclosed lead edge sensing and fixed distance vacuum belt drive here is preferred since it readily allows for a fully mechanical positive interconnection and control for the belt drive and the registration drive, and can provide uniform registration for any size document. With trail edge sensing the copying position of the document over the platen would vary with the length of the document in the feeding direction. Also, lead edge sensing by a mechanical gate is compatible with almost any type of document, whereas a photo-optical or other trail edge document sensor may not be compatible with transparent originals, etc., for certain systems. U.S. Pat. No. 3,552,739, issued Jan. 5, 1971, to R. R. Roberts et al, is noted for lead edge document registration for a moving document belt copier.

It might be thought that the applying of a vacuum to a large vacuum belt area so closely spaced from an air impervious platen as disclosed here might cause the vacuum belt to be attracted to the platen, or cause air current or pressure drops which would interfere with the vacuum retention of the document on the vacuum belt over the platen, since only a thin inter-planar air space above the platen is available for ambient air to be drawn in for the entire vacuum belt. However, this is not the case, and it has been demonstrated that good positive vacuum retention can be provided for the document on the belt, and without interference between the vacuum belt and the platen. It will be noted that there are sufficient air openings to allow the ambient air to enter the space between the vacuum belt and the platen from all sides here. Also, it will be noted that when a document is being fed onto the belt that the air flow is from underneath the document at the input area, tending to desirably lift the document toward the belt.

Further describing the document ejection, at the completion of the copying operation the copying apparatus 10 provides a known logic signal indicating the completion of the selected number of copies. This signal is connected to the document handling system to reactivate the vacuum belt drive automatically and to also simultaneously activate the solenoid 42 to lift the downstream edge of the vacuum belt to the position of FIGS. 2 and 3. (However, for clarity, the document 22 is not shown in FIG. 3). The belt is then driven for another cycle of its same pre-determined drive distance (as described above for the automatic feeding of the document into its registration position over the platen). Due to the spacing between the registration gates 56 and the platen, this pre-set distance for which the belt 16 is incrementally advanced around its rollers 26 and 28 for each document is greater than the dimensions of either the document or the platen in the feeding direction. This insures that the document which was already on the belt 16 for copying is fully ejected from the belt 16. The belt is advanced each time by a distance approximately the length of the (document supporting) lower flight 18 of the belt, and this insures that no portion of even the largest document to be copied will be retained on the belt.

As shown in FIG. 2, while one document 22 is being fed out, the next document 23 is being simultaneously fed in on the same belt 16 advancement. The document 23 lead edge is continuously spaced on the belt flight 18 following behind the trail edge of the preceding document 22 by the distance between the trail edge copying position of the preceding document and the registration gates 56. It may be seen that the document feed-in and document ejection are overlaping in time, and are accomplished by the same sequential belt movement. This represents an efficiency of time, energy, logic and control systems.

The document handling system disclosed herein is presently considered to be preferred; however, it is contemplated that numerous further variations and modifications within the purview of those skilled in the art can be made herein. For example, although this disclosed system is designed for a planar document platen, it is believed that a similiar system could be provided for various commercial copiers with slightly curved platens. This could be accomplished by providing a correspondingly curved vacuum plate 32, and by using a reduced vacuum belt tension, and by having a greater air pressure drop restriction in the air porosity or permeability of the vacuum belt 16; so that the vacuum belt 16 is more tightly restrained against the curved vacuum plate 32, thereby causing the belt, and the document thereon, to conform to that same curve, and thereby remain within the depth of field of the optics system for the curved platen.

The following claims are intended to cover all such variations and modifications of this invention as fall within its true spirit and scope.

What is claimed is:

1. In a copying apparatus with a light-transmitting air-impervious document copying platen for copying of documents by manual placement of a document on a first side of said platen, and with optical imaging means for imaging of a document through said platen, and with an alternative mechanical document handling system for feeding documents onto and off of said first side of said platen for said imaging of a document, the improvement in said document handling system comprising:

vacuum belt means normally but removably overlying said first side of said platen for transporting and retaining a document on said vacuum belt means over said first side of said platen without slippage between the document and said vacuum belt means; and spacing means for maintaining said vacuum belt means slightly but continuously spaced from and overlying said first side of said platen for holding the document spaced from but within a predetermined distance from said platen;

said vacuum belt means being continuously spaced above said platen by said spacing means by a spacing which is slightly greater than the predetermined maximum thickness of the document to be copied on said platen to prevent substantial frictional engagement between the document and said platen and to prevent any contact between said vacuum belt and said platen;

wherein said optical imaging means has a limited optical depth of field extending slightly beyond said first side of said platen;

wherein said spacing means maintains said vacuum belt means spaced above said first side of said platen within said depth of field; and wherein said document handling system includes document pre-registration means positioned off of said platen for pre-registering the edge of a document prior to its transport over said platen by said vacuum belt means, and means for advancing said vacuum belt means from said pre-registration means over said platen without slippage between said vacuum belt means and the document to provide registration positioning of the document over said platen without registration engagement of the document over said platen.

2. The copying apparatus of claim 1, wherein said vacuum belt means is held spaced from said platen substantially uniformly by a spacing which is not substantially greater than approximately 1 millimeter.

3. The copying apparatus of claim 1, including means for lifting one end of said vacuum belt means with the document thereon for assisting the ejection of the document thereon from the end which is lifted.

4. The copying apparatus of claim 1, further including document feeding means for feeding documents onto said belt concurrently with ejection of documents therefrom while one end of said belt is pivoted away from said platen, and wherein said vacuum belt means extends substantially beyond one edge of said platen toward said document feeding means.

5. The copying apparatus of claim 1, further including means for advancing said vacuum belt means by a preset distance from said pre-registration means without slippage between said vacuum belt means and the document and then stopping said vacuum belt means, to provide registration positioning of the document over said platen.

* * * * *